(12) United States Patent
Abraham et al.

(10) Patent No.: US 10,477,011 B2
(45) Date of Patent: *Nov. 12, 2019

(54) SELECTIVELY PROVIDING CONTENT TO USERS LOCATED WITHIN A VIRTUAL PERIMETER

(71) Applicant: International Business Machines Corporation, Armonk, NY (US)

(72) Inventors: Subil M. Abraham, Plano, TX (US); Vivek K. Palvia, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,088

(22) Filed: Nov. 17, 2017

(65) Prior Publication Data
US 2018/0077277 A1    Mar. 15, 2018

Related U.S. Application Data

(63) Continuation of application No. 15/491,062, filed on Apr. 19, 2017, now Pat. No. 9,860,366, which is a (Continued)

(51) Int. Cl.
*H04M 3/00* (2006.01)
*H04M 1/725* (2006.01)
(Continued)

(52) U.S. Cl.
CPC ........ *H04M 1/72577* (2013.01); *H04L 63/10* (2013.01); *H04W 4/029* (2018.02);
(Continued)

(58) Field of Classification Search
None
See application file for complete search history.

(56) References Cited

U.S. PATENT DOCUMENTS 9,071,921 B2   6/2015   Mahdi
9,332,385 B1   5/2016   Abraham et al.
(Continued)

FOREIGN PATENT DOCUMENTS

CN   1777330 A   5/2006
CN   1968500 A   5/2007
(Continued)

OTHER PUBLICATIONS

Paul, I., "Starbucks Free Unlimited Wi-Fi: A User's Guide," [online] PC World, Jul. 2, 2010, retrieved from the Internet: <http://www.pcworld.com/article/200424/starbucks_free_unlimited_wifi_a_users_guide.html?page=0>, 4 pg.
(Continued)

*Primary Examiner* — Adolf Dsouza
(74) *Attorney, Agent, or Firm* — Sheridan Ross P.C.

(57) ABSTRACT

A present physical location of a mobile device can be identified based on wireless communication between the mobile device and at least one beacon. Responsive to determining that the mobile device is located at a particular physical location, location rules associated with the particular physical location and a user profile of a user of the mobile device can be retrieved, content to be made available to the mobile device based on the location rules associated with the particular physical location and the user profile can be selected, and at least one message can be communicated to the mobile device. The message can specify an authorization for the mobile device to access the selected content using at least one application installed on the mobile device, the message configured to be processed by the mobile device to access the selected content.

20 Claims, 5 Drawing Sheets

Related U.S. Application Data continuation of application No. 15/065,286, filed on Mar. 9, 2016, now Pat. No. 9,654,617, which is a continuation of application No. 14/621,636, filed on Feb. 13, 2015, now Pat. No. 9,332,385.

(51) Int. Cl.

| | | |
|---|---|---|
| *H04W 48/04* | (2009.01) | |
| *H04W 4/029* | (2018.01) | |
| *H04L 29/06* | (2006.01) | |
| *H04W 64/00* | (2009.01) | |
| *H04W 12/08* | (2009.01) | |
| *H04W 12/00* | (2009.01) | |

(52) U.S. Cl.
CPC .......... *H04W 12/08* (2013.01); *H04W 48/04* (2013.01); *H04W 64/00* (2013.01); *H04W 12/00503* (2019.01)

(56) References Cited

U.S. PATENT DOCUMENTS

| | | | |
|---|---|---|---|
| 9,654,617 | B2 | 5/2017 | Abraham et al. |
| 9,860,366 | B2 | 1/2018 | Abraham et al. |
| 2007/0129083 | A1 | 6/2007 | Creamer et al. |
| 2009/0082001 | A1 | 3/2009 | Rahul et al. |
| 2010/0317336 | A1 | 12/2010 | Ferren et al. |
| 2012/0054179 | A1 | 3/2012 | Zhu et al. |
| 2012/0059913 | A1* | 3/2012 | Imbimbo ............ H04W 36/385 709/219 |
| 2012/0309373 | A1 | 12/2012 | Abogendia |
| 2014/0171052 | A1 | 6/2014 | Lamarca et al. |
| 2014/0229603 | A1* | 8/2014 | Crowther .............. H04W 4/021 709/224 |
| 2016/0241708 | A1 | 8/2016 | Abraham et al. |
| 2017/0223175 | A1 | 8/2017 | Abraham et al. |

FOREIGN PATENT DOCUMENTS

| | | |
|---|---|---|
| CN | 1976532 A | 6/2007 |
| CN | 101835093 A | 9/2010 |
| CN | 101925152 A | 12/2010 |
| CN | 103984889 A | 8/2014 |
| CN | 105893454 A | 8/2016 |
| DE | 102016102434 A1 | 8/2016 |
| WO | 2014063124 A1 | 4/2014 |

OTHER PUBLICATIONS

IBM: List of IBM Patents or Patent Applications Treated as Related, 2 pg.

Abraham et al., "Selectively Providing Content to Users Located Within a Virtual Perimeter", U.S. Appl. No. 14/621,636, filed Feb. 13, 2015, 33 pages.

Abraham et al., "Selectively Providing Content to Users Located Within a Virtual Perimeter", U.S. Appl. No. 15/065,286, filed Mar. 9, 2016, 33 pages.

Abraham et al., "Selectively Providing Content to Users Located Within a Virtual Perimeter", U.S. Appl. No. 15/491,062, filed Feb. 13, 2015, 33 pages.

* cited by examiner

SELECTIVELY PROVIDING CONTENT TO USERS LOCATED WITHIN A VIRTUAL PERIMETER

BACKGROUND

The present invention relates to communication networks and, more specifically, to providing network services.

The use of tablet computers and smart phones (hereinafter collectively referred to as "mobile devices") has grown significantly over the last decade and now is commonplace throughout the industrialized world. On mobile devices, users typically spend more time using mobile applications to access web based content than they spend using web browsers, and the disparity between mobile application usage and web browser usage continues to grow. This is because a well-designed mobile application typically delivers a superior user experience than a web browser. There are several reasons for this. First, mobile applications are much like desktop software in that they can store resources locally, whereas a web browser must retrieve all data for a website from a web server. In a mobile application, interface controls operate without the same lag time of websites, which require the transfer data back and forth between the web server and the web browser. Lastly, mobile applications also can tie into the functionality of the mobile device, which is not possible with a website being accessed via a web browser.

SUMMARY

A method includes, based on wireless communication between a mobile device and at least one beacon, identifying a present physical location of the mobile device. The method also can include, responsive to determining that the mobile device is located at a particular physical location, retrieving location rules associated with the particular physical location and retrieving a user profile of a user of the mobile device, selecting, using a processor, content to be made available to the mobile device based on the location rules associated with the particular physical location and the user profile, and communicating to the mobile device at least one message, the message specifying an authorization for the mobile device to access the selected content using at least one application installed on the mobile device, the message configured to be processed by the mobile device to access the selected content.

A system includes a processor programmed to initiate executable operations. The executable operations include, based on wireless communication between a mobile device and at least one beacon, identifying a present physical location of the mobile device. The executable operations also can include, responsive to determining that the mobile device is located at a particular physical location, retrieving location rules associated with the particular physical location and retrieving a user profile of a user of the mobile device, selecting content to be made available to the mobile device based on the location rules associated with the particular physical location and the user profile, and communicating to the mobile device at least one message, the message specifying an authorization for the mobile device to access the selected content using at least one application installed on the mobile device, the message configured to be processed by the mobile device to access the selected content.

A computer program includes a computer readable storage medium having program code stored thereon. The program code is executable by a processor to perform a method. The method includes, based on wireless communication between a mobile device and at least one beacon, identifying, by the processor, a present physical location of the mobile device. The method also can include, responsive to determining that the mobile device is located at a particular physical location, retrieving, by the processor, location rules associated with the particular physical location and retrieving a user profile of a user of the mobile device, selecting, by the processor, content to be made available to the mobile device based on the location rules associated with the particular physical location and the user profile, and communicating, by the processor, to the mobile device at least one message, the message specifying an authorization for the mobile device to access the selected content using at least one application installed on the mobile device, the message configured to be processed by the mobile device to access the selected content.

DETAILED DESCRIPTION

Figure 1:
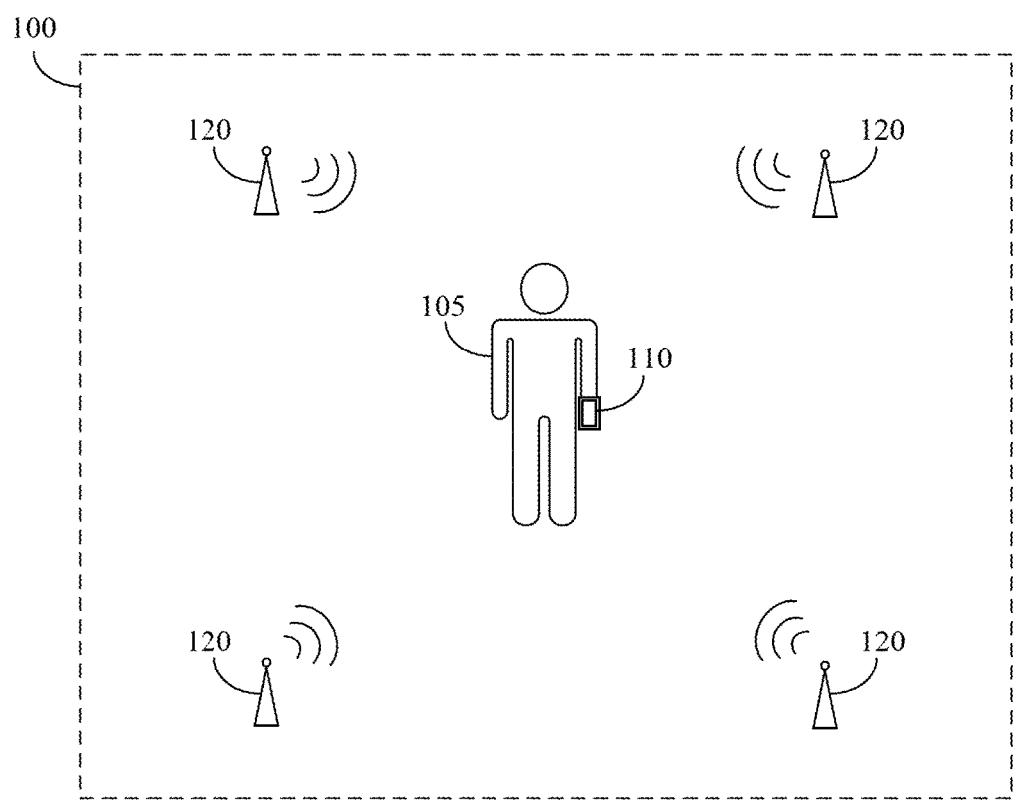
FIG. 1 is diagram illustrating implementation of a virtual perimeter.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to communication networks and, more specifically, to providing network services. Several definitions that apply throughout this document now will be presented.

As defined herein, the term "virtual perimeter" means a perimeter defined for a physical location wherein presence of a user or device within the physical region is detected via one or more electronic devices or systems.

As defined herein, the term "physical location" means a location where a user may be physically present. Examples of physical locations include, but are not limited to, a building, a store, a restaurant, a coffee shop, a library, an airport, an airplane, a train, boat, bus, and the like. A physical location also may be a particular portion of a building, a store, a restaurant, a coffee shop, a library, an airport, an airplane, a train, boat, bus, and the like. As defined herein, a "physical location" is not a website, user forum or the like.

As defined herein, the term "user" means a person (i.e., a human being).

As defined herein, the term "mobile device" means a wireless computing device including at least one processor, memory elements, and at least one transceiver (or transmitter/receiver pair) configured to wirelessly communicate data. Examples of a mobile device include, but are not limited to, a tablet computer and a smart phone.

As defined herein, the term "mobile application" means an application specifically configured to be executed by a processor of a mobile device.

As defined herein, the term "content" means audio, video, images, multimedia and/or text configured to be communicated over at least one network for presentation to a user on a mobile device.

As defined herein, the term "message" means digital data communicated between at least two devices over at least one network to convey digital information between the devices. A message may be carried in one or more packets or frames. As defined herein, a "message" is not a text message sent using the simple message service (SMS), a message sent using the Multimedia Messaging Service (MMS) or an electronic mail (e-mail).

As defined herein, the term "location rule" means a rule pertaining to users/mobile devices are authorized to access content based, at least in part, on whether the user/mobile device is physically present at a particular physical location. A location rule also can determine whether users/mobile devices are authorized to access content based on user profile data, content subscription levels, or any other applicable information.

As defined herein, the term "user profile data" means data pertaining to users. A user profile can be created for each user of a particular system, and each user profile can include user profile data for a particular user.

As defined herein, the phrases "presence on a network," "presence on the network" and "network presence" mean a condition in which a device is connected to a network and able to send and receive data over the network. A series of messages typically are exchanged between a device and the network, for example during a handshake procedure, to authenticate the device. Once the handshake procedure is properly completed, network presence on the network is established for the device.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

FIG. 1 is diagram illustrating implementation of a virtual perimeter 100 defined for a physical location. Presence of one or more mobile devices, such as a mobile device 110 used by a user 105, within the virtual perimeter 100 can be detected by one or more electronic devices or systems. For example, one or more beacons 120 can be deployed at the physical location to detect whether mobile devices 110 are present in the virtual perimeter 100, and thus present at the physical location. A beacon 120 can include a transceiver that transmits a wireless beacon signal. In illustration, the beacon 120 can include a Bluetooth® low-energy (BLE) transmitter or transceiver that transmits the beacon signal. In one arrangement, the beacon signal can include a universally unique identifier (UUID), which is an identifier that is unique to the beacon 120. The major value can be a value that identifies a local group of beacons that includes the beacon 120, for example if more than one beacon 120 is deployed at the physical location. The minor value can identify the beacon 120 within the local group of beacons 120. In this regard, using one or more beacons 120, the beacons 120 can define the virtual perimeter 100 for the physical location.

When a mobile device 110 is in range of a beacon 120, the mobile device 110 can detect the beacon signal, for example via a BLE receiver or transceiver. The mobile device 110 can process the beacon signal, for example using a suitably configured application, to determine (or estimate) a distance of the mobile device 110 to the beacon 120. The mobile device 110 can determine (or estimate) the distance, for example, based on a strength of the received signal. The mobile device 110 can wirelessly communicate to the beacon 120 a response to the beacon signal. The response can indicate the determined (or estimated) distance of the mobile device 110 from the beacon 120. The response also can include a user identifier associated with the user of the mobile device 110, a media access control (MAC) address of the mobile device 110, or the like.

Figure 2:
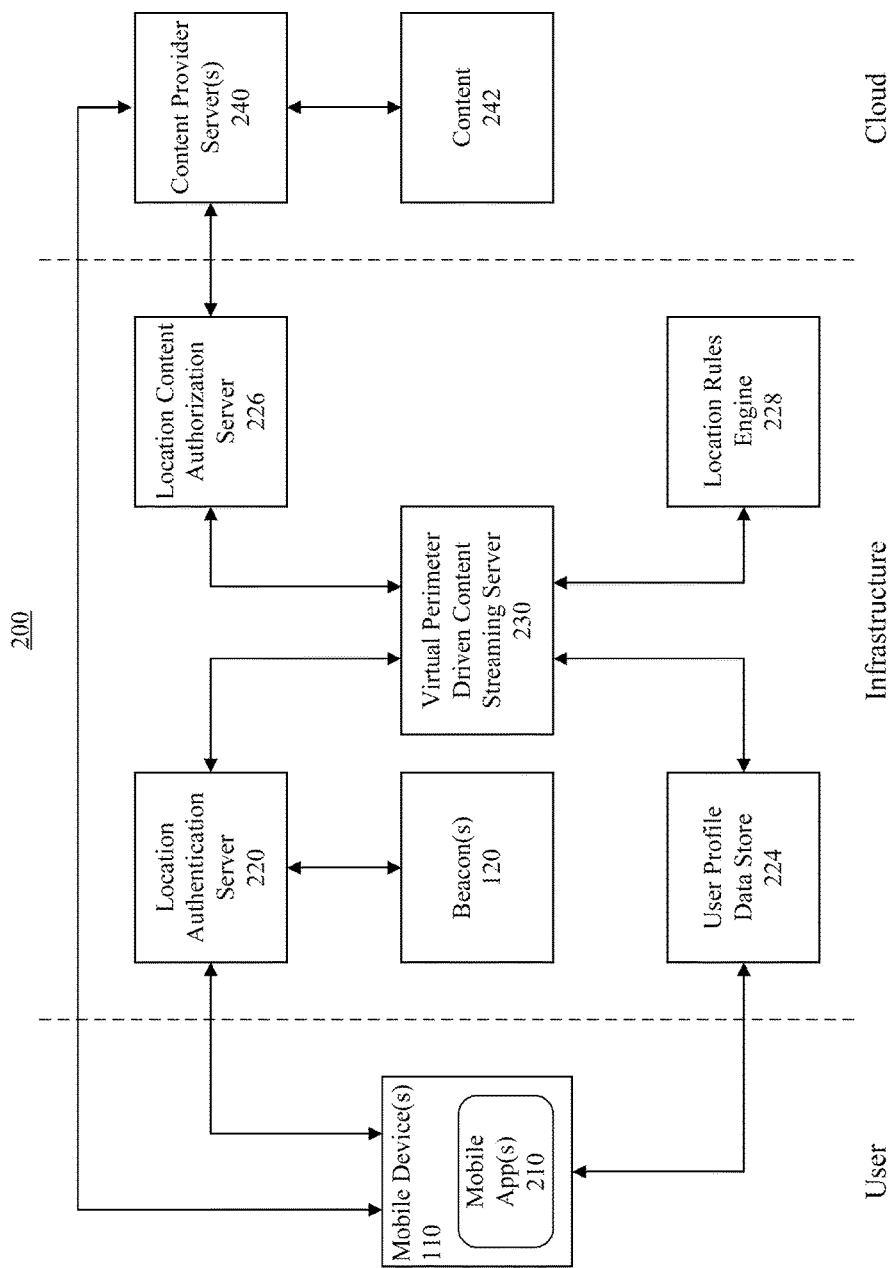
FIG. 2 is a block diagram illustrating an example of a communication system.

FIG. 2 is a block diagram illustrating an example of a communication system (hereinafter "system") 200. In accordance with the arrangements described herein, based on detecting presence of a mobile device 110 at a particular physical location, the system 200 can implement any number of processes. Such processes can include providing to the mobile device 110 access to a network maintained for the physical location based on the mobile device's presence at the physical location. The processes also can include providing to the mobile device 110 content 242 selected for the mobile device 110 based, at least in part, on the mobile device's presence in the physical location. The content 242 also can be selected based on a user profile associated with a user of the mobile device 110. Further, one or more applications on the mobile device 110 can be enabled and/or disabled based on the presence of the mobile device 110 at the physical location. For example, a subset of mobile applications on the mobile device 110 can be disabled based on the presence of the mobile device 110 at the physical location. Similarly, a subset of mobile applications on the mobile device 110 can be enabled based on the presence of the mobile device 110 at the physical location.

The system 200 can include location authentication server 220. The location authentication server 220 can be communicatively linked to the beacon(s) 120 and detect the present physical location of one or more mobile devices, such as a mobile device 110, based on data received from the beacon(s) 120. For example, based on the determined (or estimated) distance of the mobile device 110 from the beacon 120, and the UUID, major value and/or minor value assigned to that beacon 120, the location authentication server 220 can determine whether the mobile device 110 is present at the particular physical location, and where at the physical location the mobile device 110 is present. For instance, the location authentication server 220 can determine to which beacon 120 the mobile device 110 is closest, and the distance, or estimated distance, of the mobile device 110 from that beacon 120. Moreover, based on information received from at least two beacons 120, the location authentication server 220 can implement trilateration to determine the location of the mobile device 110.

The system 200 also can include a user profile data store 224. The user profile data store can store user profile data for a plurality of users, including the user of the mobile device 110. The user profile data can include user identifiers, user authentication information such as passwords, MAC addresses, and/or the like. The user profile data also can include user loyalty information. User loyalty information for a particular user can include, but is not limited to, information indicating the number of times the user has visited the physical location (e.g., an establishment), the frequency at which the user visits the physical location, the number of times the user has purchased goods/services at the physical location or from an entity associated with the physical location (e.g., business, organization, etc.), the frequency at which the user purchases goods/services, the value of goods/services purchased, information related to customer loyalty points that have been awarded to users, information related to credits that have been assigned to users, etc. The customer loyalty information also can include any other information indicative of the user's loyalty to the entity associated with the physical location.

The system 200 further can include a location content authorization server 226. The location content authorization server 226 can interface with one or more content provider servers 240 that provide content 242 made available by the system 200 to mobile devices, such as the mobile device 110. The location content authorization server 226 can maintain, for example, subscription information for content 242 for which the entity associated with the physical location has subscribed. The location content authorization server 226 also can maintain a listing of such content 242, for example in a database or a suitable file. The location content authorization server 226 can periodically poll the content provider servers 240 to receive updates on content 242 that is available. For example, as new content 242 becomes available, and other content may become unavailable, the location content authorization server 226 can update the listing of available content. The location content authorization server 226 can publish a listing of the content 242, which can be accessed by a virtual perimeter driven content streaming server (hereinafter referred to as "content streaming server") 230, which will be described.

The content provider server(s) 240 can be servers of content providers who provide content 242 which may be desired by users of mobile devices 110. Such content 242 can be, for example, media provided by television networks, news networks, video on demand networks (e.g., Netflix®, Hulu™, etc.), digital magazines, etc. In this regard, the content providers can create and/or hold distribution rights for the content 242 that is made available by the system 200 to the mobile devices 110.

The system 200 also can include a location rules engine 228. The location rules engine 228 can maintain location rules specific to the particular physical location. The location rules can define what content 242 is available to each of the mobile devices 110, for example based on the present physical location of each mobile device 110, user profile data associated with the respective user of each mobile device 110, a content subscription level of an entity associated with the physical location, etc. The location rules also can define requisite conditions for a mobile device 110 to establish network presence on the network maintained for the physical location. A requisite condition can be, for example, that a user is in good standing with an entity associated with the physical location, a time of day, a day of the week, or the like.

The system also can include the content streaming server 230. The content streaming server 230 can interface with the location authentication server 220, the user profile data store 224, the location content authorization server 226 and the location rules engine 228 to determine whether respective mobile devices 110 are authorized to establish network presence on a network maintained for the physical location, and what content 242 is available to each respective mobile device 110.

In illustration, responsive to the location authentication server 220 determining that a mobile device 110 presently is located at a particular location, the location authentication server 220 can communicate corresponding information to the content streaming server 230. Such information can indicate not only that the mobile device 110 is present at the physical location, for example within a virtual perimeter, but also a user identifier associated with the user of the mobile device 110 and/or a MAC address of the mobile device 110. The content streaming server 230 can access the user profile data store 224 to retrieve user profile information associated with the user of the mobile device 110. Based on the information received from the location authentication server 220 and the user profile information, the content streaming server 230 can determine whether the mobile device 110 is authorized to establish presence on the network maintained for the physical location. Such network can be, for example a local area network (LAN). The LAN can include, for example, a WiFi™ network. Responsive to determining that the mobile device 110 is authorized to establish presence on the network maintained for the physical location, the content streaming server 230 can communicate to the network a corresponding authorization. Responsive to receiving the authorization, the network can complete a handshake process with the mobile device 110 for the mobile device to establish presence on the network. Once the mobile device 110 has established presence on the network, the network can provide to the mobile device 110 a connection to the Internet.

Responsive to the mobile device 110 establishing presence on the network, the content streaming server 230 can retrieve and process the user profile information of the user, the location rules, and a listing of subscribed content 242 (or subscription levels) to select content 242 to be made available to the mobile device 110. In illustration, the content streaming server 230 can consider a level of the user's loyalty when selecting the content. For example, if the user has never before made a purchase from the entity associated with the physical location, a subset of the content 242 that is subscribed to can be made available to the mobile device 110. The subset can include, for example, base content. If the user infrequently makes purchases, a larger subset of the content 242 can be made available to the mobile device 110. The larger subset can include, for example, base content and mid-level content. If the user frequently makes purchases, and thus is a highly valued customer, an even larger subset of the content 242 can be made available, or all of the content 242 can be made available, to the mobile device 110.

Such content can include base content, mid-level content and premium content. In one arrangement, the determination of which content is base content, mid-level content and premium content can be based on subscription levels. In another arrangement, such determination can be made by a system administrator, for example a system administrator of the entity associated with the physical location.

In another example, the variety of content 242 that is made available to the mobile device 110 can be determined based on where in the physical location the mobile device 110 is located. For example, if the mobile device 110 is located in a coach section of an airplane, a subset of the content 242 can be made available to the mobile device 110. If the mobile device 110 is located in a business class section of an airplane, a larger subset of the content 242 can be made available to the mobile device 110. If the mobile device is located in a first class section of the airplane, an even larger subset of the content 242 can be made available, or all of the content 242 can be made available, to the mobile device 110. Similarly, on a cruise ship, a mobile device 110 located in an economy cabin can be provided access to a subset of content 242, a mobile device 110 located in a deluxe cabin can be provided access to a larger subset of the subscribed content 242, and a mobile device 110 located in a suite can be provided access to an even larger subset, or all of the content 242. These are but a few examples of how the level of content 242 can be selected for various users, and those skilled in the art will appreciate that these examples can be applied to different floors of a building (e.g., a hotel), different rooms in a building, different sections in an arena, etc.

In one arrangement, the content 242 available to each mobile device 110 can be based on subscription levels. For example, a first subscription level can include access to a subset of the content 242, a second subscription level can include access to a larger subset of the content 242, and a third subscription level can include access to an even larger subset, or all of the content 242. Accordingly, based on the specific location of a mobile device 110 within the physical location, the mobile device 110 can be assigned a specific subscription level.

In a further arrangement, the content 242 that is made available to the mobile device 110 can be selected, based on the user profile of the user of the mobile device 110, to be content 242 relevant to the user's interests. For example, if the user has previously accessed content 242 via the system 200, data associated with the content 242 can be saved to the user's user profile. The data can indicate a genre of the content 242 accessed, specific publications accessed, etc. The content streaming server 230 can process this information to identify content 242 that likely will be of most interest to the user, and select that content to be made available for access by the mobile device 110.

Responsive to determining which content 242 is to be made available to the mobile device 110, the content streaming server 230 can communicate to the location content authorization server 226 an identifier identifying the user and/or the mobile device 110, and a list of content 242 the user/mobile device 110 is authorized to access or a subscription level assigned to the mobile device 110. The location content authorization server 226 can communicate corresponding information to the content provider server(s) 240, for example directly or through a message broker. Responsive to receiving the information, the content provider server(s) 240 can identify the user of the mobile device 110 as a guest of the content delivery services they provide, regardless of whether the user has his/her own subscription(s) to the services. Further, the content provider server(s) 240 can make available to the mobile device 110 access to the content 242 the information indicates the user is authorized to access. If the user has his/her own subscriptions to the services, access to content 242 the user subscribes to also can be provided to the mobile device 110.

Further, responsive to determining which content 242 is to be made available to the mobile device 110, the content streaming server 230 can communicate to the mobile device 110 at least one message via the network maintained for the physical location. The message(s) can specify an authorization for the mobile device 110 to access the selected content using at least one mobile application 210 installed on the mobile device 110. The message(s) can be configured to be processed by the mobile device 110 to activate the particular mobile application(s) 210 installed on the mobile device 110 to access the selected content 242 based on the authorization. The mobile application 210 can be, for example, a mobile application provided by the entity associated with the physical location. The user of the mobile device 110 can access the mobile application 210 from a website, or access the mobile application in another suitable manner, and install the mobile application 210 on the mobile device 110.

Responsive to receiving the message(s) from the content streaming server 230, the mobile device 110 can automatically launch the mobile application 210. The authorization specified by the message(s) can be processed by the mobile application 210 to connect, via the network maintained for the physical location, to the content provider server(s) 240. Further, the mobile application 210 can communicate to the content provider server(s) 240 information identifying the user/mobile device 110. Optionally, the information also can indicate a subscription level. The content provider server(s) 240 can process the information to identify information received from the location content authorization server 226 pertaining to that user/mobile device 110, and identify the content 242 the mobile device 110 is authorized to access. Further, the content provider server(s) 240 can communicate to the mobile application 210 one or more messages indicating the content 242 the user/mobile device 110 is authorized to access.

Responsive to receiving the message(s), the mobile application 210 can present a list of such content 242 to the user. For example, the mobile application can present the list on the display of the mobile device 110. The list can include various user selectable fields and/or controls which the user may choose to view information related to the content 242 (e.g., synopses, summaries, etc.) and to select the content 242 for presentation. Responsive to the user selecting a particular content 242 for presentation, the mobile application 210 can retrieve that content 242 from the content provider server(s) 240 via the Internet connection provided by the network maintained for the physical location. Presentation of the content 242 can be initiated by the mobile application 210. For example, the mobile application 210 can present the content 242, or the mobile application 210 can automatically launch another application to present the content 242.

In one aspect, the mobile application 210 can augment other mobile applications already installed on the mobile device 110. For example, if the content 242 authorized to be accessed by the mobile device 110 based on the mobile device's presence at the physical location is content for which another application on the mobile device 110 is configured to present, the mobile application 210 can interface with such other application to make the content 142 available for presentation by such application. Moreover, the mobile application 210 can interface with such other application so that the other application can present to the user, via a user interface, an option to access the content 142.

In one arrangement, access to the content 242 is only available to be initiated by the mobile device 110 while the mobile device 110 still is located at the particular physical location. For example, responsive to the beacon(s) 222 detecting that the mobile device 110 is no longer present at the physical location, for example the mobile device 110 has left the virtual perimeter, the location authentication server 220 can communicate a corresponding message to the content streaming server 230. In response, the content streaming server 230 can communicate, via the network maintained for the physical location, a message to the mobile application 210. Responsive to receiving the message, the mobile application 210 can disable functionality that enables a user to access the content 242 the mobile device 110 was authorized to access while being present at the physical location. In one aspect, the mobile device 110 may continue presenting content 242 the user has already accessed. In another aspect, the mobile application 210 can cease presenting the content 242, or close another application that is presenting the content 242. Further, the mobile application 210 can prevent the content 242 from again being presented until the mobile device 110 again is located at the physical location. In a further aspect, in response to receiving the message, the mobile application 210 can close. Further, the mobile application can remain closed until being automatically opened when the user again enters the physical location. On or more services can be installed on the mobile device 110 with the mobile application 210 to control when the mobile application 210 may be opened or closed.

In a further arrangement, responsive to the mobile device 110 being present at the physical location, the content streaming server 230 can communicate to the mobile device 110 one or more messages that specify at least one application installed on the mobile device which is to be disabled while the mobile device 110 is located at the particular physical location. The message can be configured to be processed by the mobile device 110 to deactivate such application(s) while the mobile device still is located at the particular physical location. The mobile application 210, or a service installed on the mobile device 110, can be configured to process the message to deactivate the application(s).

In one aspect, the content streaming server 230 may require deactivation of the specified application(s) prior to the mobile device 110 being authorized to establish presence on the network maintained for the physical location. In illustration, responsive to receiving the message, the mobile device 110 can prompt the user to confirm whether the user agrees to have the indicated applications deactivated. If the user agrees, the mobile application 210, or a service, can deactivate the specified applications and communicate a message to the network, for example during the handshake procedure, indicating the specified application(s) is/are deactivated. Such message can be forwarded to the content streaming server 230. Responsive to receiving the message, the content streaming server 230 can communicate an authorization for the mobile device 110 to establish presence on the network. In response, the network can complete the handshake process and the mobile device 110 can establish presence on the network, and the network can provide to the mobile device 110 Internet access. If the user does not agree to have the specified application(s) deactivated, the mobile application 210, or a service, can communicate a message to the network, for example during the handshake procedure, indicating the specified application(s) is/are not deactivated. Again, such message can be forwarded to the content streaming server 230. Responsive to receiving the message, the content streaming server 230 can deny access for the mobile device 110 to establish presence on the network.

By way of example, certain organizations may not want pictures taken within their establishment. The message communicated to the mobile device 110 can cause image/video capture applications to be deactivated while the mobile device 110 is in that establishment. Similarly, a library may not want patrons of the library playing music and/or videos on their mobile devices 110 when the patrons are in the library. Accordingly, the message can be processed by the mobile devices 110 to disable playback of music and/or videos on the mobile devices 110. Still, other applications can be deactivated and the present arrangements are not limited in this regard.

Further, the message(s) can specify a subset of applications on the mobile device 110 that may only be executed while the mobile device 110 is located at the particular physical location. The message can be configured to be processed by the mobile device 110 to deactivate at least one application, for example a subset applications, that are not authorized for use while the mobile device 110 is located at the particular physical location. In illustration, the proprietor of a coffee shop may only want patrons using certain mobile applications while in the coffee shop. For example, the message can specify certain music applications (e.g., Pandora®, Spotify®, etc.) and certain ebook applications (e.g., Kindle™, Nook®, etc.) that may be executed. The mobile application 210, or a service installed on the mobile device 110, can be configured to, responsive to receiving the message, deactivate any applications on the mobile device 110 that are not indicated in the message as being allowable for use in the establishment. In another aspect, rather than deactivating all other applications, the mobile application 210 or service can deactivate certain types of applications.

For example, the message can indicate to deactivate all media playback applications other than the ones that are specified, or indicate certain media playback applications (e.g., YouTube™) that are to be deactivated. Again, the user can be prompted to indicate whether the user agrees to deactivation of certain applications. If the user agrees, the mobile application 210, or a service, can deactivate the specified applications and communicate a message to the network, for example during the handshake procedure, indicating the specified application(s) is/are deactivated. Such message can be forwarded to the content streaming server 230. Responsive to receiving the message, the content streaming server 230 can communicate an authorization for the mobile device 110 to establish presence on the network. In response, the network can complete the handshake process and the mobile device 110 can establish presence on the network, and the network can provide to the mobile device 110 Internet access. If the user does not agree, the user can be denied access to establish presence on the network.

Assuming that one or more applications on the mobile device 110 have been deactivated while the mobile device 110 is located at the physical location, responsive to the mobile device 110 leaving the physical location, such applications can be re-activated. For example, responsive to the location authentication server 220 detecting, via the beacon(s) 120, that the mobile device 110 no longer is present at the physical location, the content streaming server 230 can communicate to the mobile device 110 a message indicating that any deactivated applications can be reactivated. Responsive to receiving such message, the mobile application 210, or a service installed on the mobile device 110, can reactivate such applications.

Figure 3:
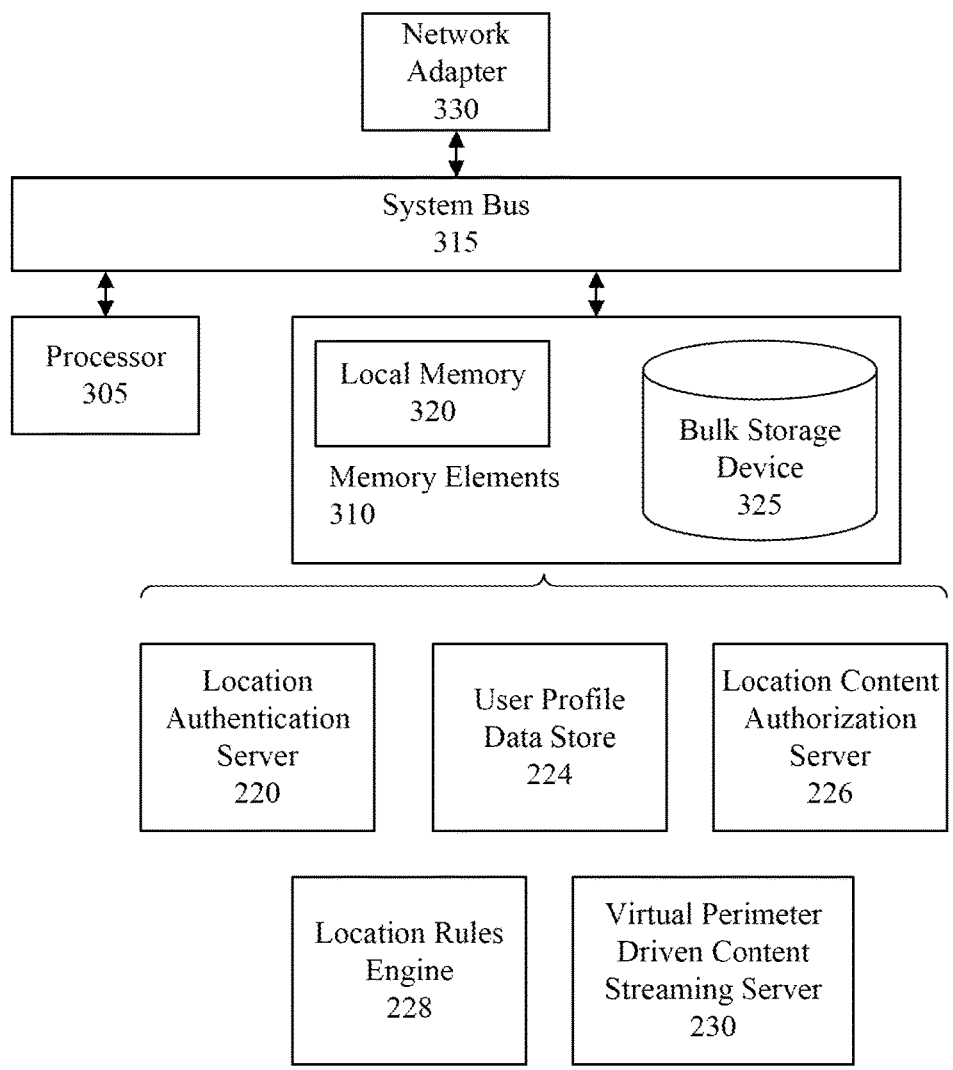
FIG. 3 is a block diagram illustrating example architecture for a data processing system.

FIG. 3 is a block diagram illustrating example architecture for a data processing system 300 configured to implement one or more of the processes described herein. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as one or more hardware servers.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories (not shown) that provide temporary storage of at least some program code in order to reduce the number of times program code must be retrieved from the bulk storage device 325 during execution.

One or more network adapters 330 can be coupled to data processing system 300 to enable the data processing system 300 to become coupled to other systems, computer systems, remote printers, and/or remote storage devices through intervening private or public networks. Modems, cable modems, transceivers, and Ethernet cards are examples of different types of network adapters 330 that can be used with the data processing system 300.

As pictured in FIG. 3, the memory elements 310 can store the components of the system 200 of FIG. 2, namely the location authentication server 220, the user profile data store 224, the location content authorization server 226, the location rules engine 228 and the content streaming server 230. Being implemented in the form of executable program code, these components of the system 200 can be executed by the data processing system 300 and, as such, can be considered part of the data processing system 300. Moreover the location authentication server 220, the user profile data store 224, the location content authorization server 226, the location rules engine 228 and the content streaming server 230 are functional data structures that impart functionality when employed as part of the data processing system 300 of FIG. 3. Moreover, any messages generated by these components also are functional data structures that impart functionality when employed as part of the data processing system 300 of FIG. 3.

At this point it should be noted that, in one arrangement, the location authentication server 220, user profile data store 224, location content authorization server 226, location rules engine 228 and content streaming server 230 can be hosted locally, for example by one or more processing systems, such as the data processing system 300, at the physical location. In another arrangement, one or more of these components can be hosted remote from the physical location, for example by one or more processing systems. In such case, the beacon(s) 120 and network maintained for the physical location can be communicatively linked to the location authentication server 220, user profile data store 224, location content authorization server 226, location rules engine 228 and/or content streaming server 230 via one or more networks. Moreover, the location authentication server 220, user profile data store 224, location content authorization server 226, location rules engine 228 and content streaming server 230 can be configured to service more than one physical location.

Figure 4:
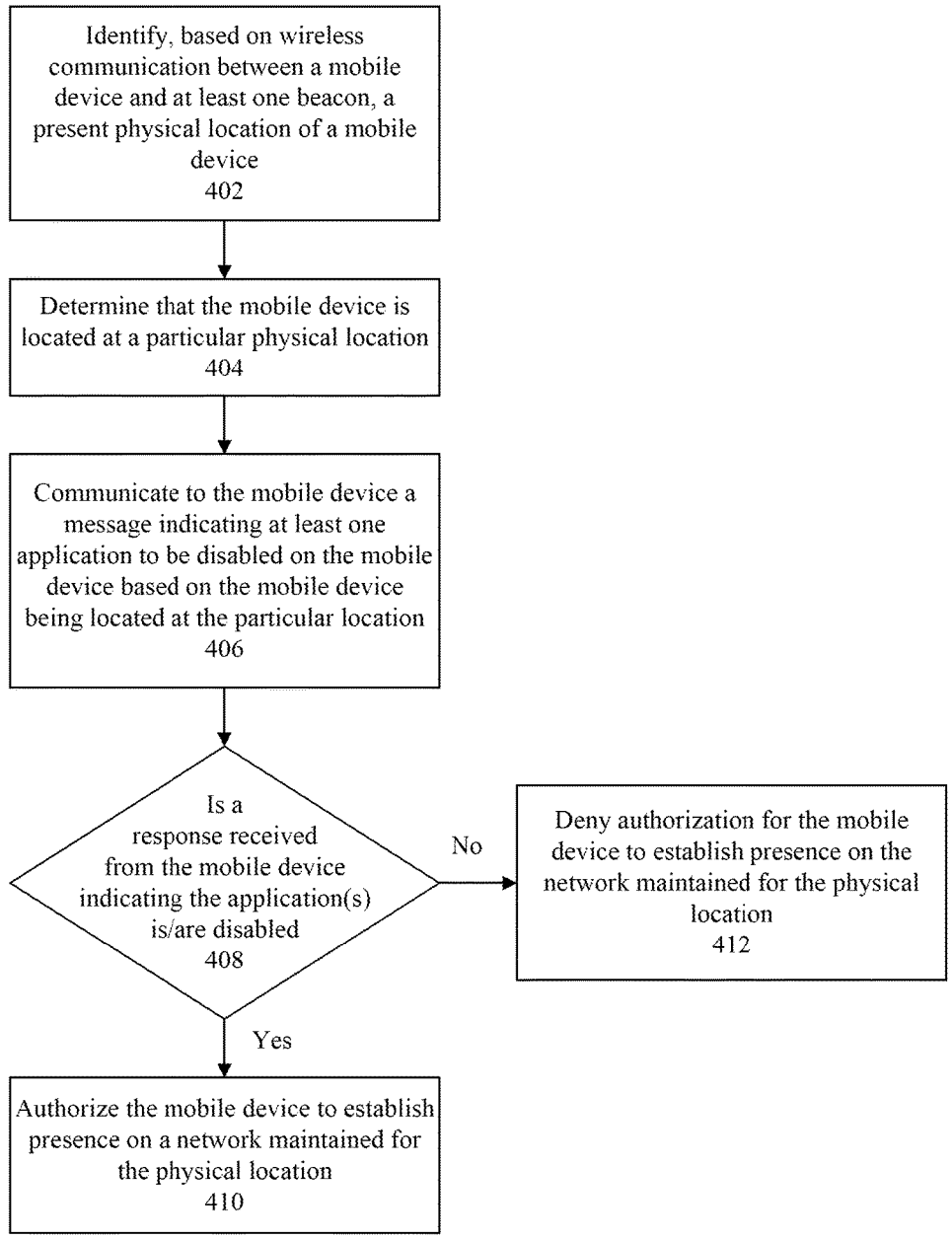
FIG. 4 is a flow chart illustrating an example of a method of selectively providing access to a network.

FIG. 4 is a flow chart illustrating an example of a method 400 of selectively providing access to a network. At step 402, a present physical location of a mobile device can be identified based on wireless communication between a mobile device and at least one beacon. At step 404, a determination can be made that the mobile device is located at a particular location. For example, a determination can be made that the mobile device is located within a virtual perimeter defined by one or more beacons. At step 406, a message can be communicated to the mobile device indicating at least one application to be disabled on the mobile device based on the mobile device being located at the particular location. Referring to decision box 408, a determination can be made as to whether a response to the message is received from the mobile device indicating the application(s) is/are disabled on the mobile device. If a response which indicates that the application(s) is/are disabled is received, at step 410, the mobile device can be authorized, using a processor, to establish presence on a network maintained for the physical location. If a response which indicates that the application(s) is/are disabled is not received, at step 412, authorization to establish presence on the network maintained for the physical location can be denied to the mobile device.

Figure 5:
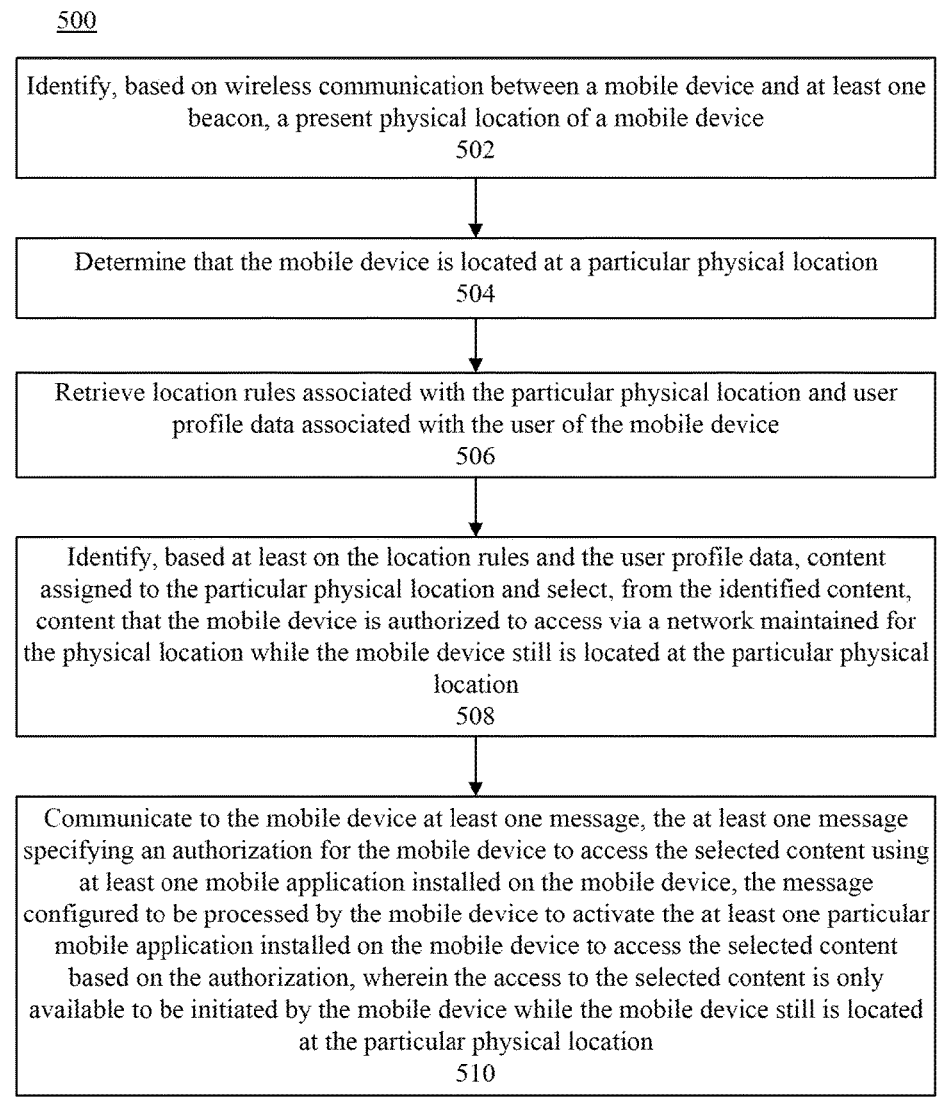
FIG. 5 is a flow chart illustrating an example of a method of selectively providing access to content.

FIG. 5 is a flow chart illustrating an example of a method 500 of selectively providing access to content. At step 502, a present physical location of a mobile device can be identified based on wireless communication between a mobile device and at least one beacon. At step 504, a determination can be made that the mobile device is located at a particular location. For example, a determination can be made that the mobile device is located within a virtual perimeter defined by one or more beacons. At step 506, location rules associated with the particular physical location and user profile data associated with the user of the mobile device can be retrieved. At step 508, based at least on the location rules and the user profile data, content assigned to the particular physical location can be identified. Further content that the mobile device is authorized to access via the network while the mobile device still is located at the particular physical location can be selected from the identified content. At step 510, at least one message can be communicated to the mobile device. The at least one message can specify an authorization for the mobile device to access the selected content using at least one mobile application installed on the mobile device. The message can be configured to be processed by the mobile device to activate the at least one particular mobile application installed on the mobile device to access the selected content based on the authorization, wherein the access to the selected content is only available to be initiated by the mobile device while the mobile device still is located at the particular physical location.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    based on wireless communication between a mobile device and at least one beacon, identifying a present physical location of the mobile device; and
    responsive to determining that the mobile device is located at a particular physical location:
        retrieving location rules associated with the particular physical location and retrieving a user profile of a user of the mobile device;
        selecting, using a processor, content to be made available to the mobile device based on the location rules associated with the particular physical location and the user profile; and
        communicating to the mobile device at least a first message, the first message specifying an authorization for the mobile device to access the selected content using at least one application installed on the mobile device, the first message configured to be processed by the mobile device to access the selected content.

2. The method of claim 1, wherein the determining that the mobile device is located at the particular physical location comprises detecting that the mobile device is present within a virtual perimeter defined at the particular physical location.

3. The method of claim 1, wherein the access to the selected content is only available to be initiated by the mobile device while the mobile device still is located at the particular physical location.

4. The method of claim 1, wherein the at least one application installed on the mobile device is enabled based on presence of the mobile device at the particular physical location.

5. The method of claim 1, further comprising: detecting that the mobile device is no longer present at the particular physical location; and responsive to detecting that the mobile device is no longer present at the particular physical location, communicating at least a second message to the mobile device, the second message causing the mobile device to disable functionality that enables the user to access the selected content.

6. The method of claim 5, wherein the second message further causes the at least one application installed on the mobile device to close.

7. The method of claim 5, wherein the detecting that the mobile device is no longer present at the particular physical location comprises detecting that the mobile device has left a virtual perimeter defined at the particular physical location.

8. A system, comprising:
    a processor programmed to initiate executable operations comprising:
    based on wireless communication between a mobile device and at least one beacon, identifying a present physical location of the mobile device; and
    responsive to determining that the mobile device is located at a particular physical location:
        retrieving location rules associated with the particular physical location and retrieving a user profile of a user of the mobile device;
        selecting content to be made available to the mobile device based on the location rules associated with the particular physical location and the user profile; and
        communicating to the mobile device at least a first message, the first message specifying an authorization for the mobile device to access the selected content using at least one application installed on the mobile device, the first message configured to be processed by the mobile device to access the selected content.

9. The system of claim 8, wherein the determining that the mobile device is located at the particular physical location comprises detecting that the mobile device is present within a virtual perimeter defined at the particular physical location.

10. The system of claim 8, wherein the access to the selected content is only available to be initiated by the mobile device while the mobile device still is located at the particular physical location.

11. The system of claim 8, wherein the at least one application installed on the mobile device is enabled based on presence of the mobile device at the particular physical location.

12. The system of claim 8, the executable operations further comprising:
  detecting that the mobile device is no longer present at the particular physical location; and
  responsive to detecting that the mobile device is no longer present at the particular physical location, communicating at least a second message to the mobile device, the second message causing the mobile device to disable functionality that enables the user to access the selected content.

13. The system of claim 12, wherein the second message further causes the at least one application installed on the mobile device to close.

14. The system of claim 12, wherein the detecting that the mobile device is no longer present at the particular physical location comprises detecting that the mobile device has left a virtual perimeter defined at the particular physical location.

15. A computer program product comprising a computer readable storage medium having program code stored thereon, the program code executable by a processor to perform a method comprising:
  based on wireless communication between a mobile device and at least one beacon, identifying, by the processor, a present physical location of the mobile device; and
  responsive to determining that the mobile device is located at a particular physical location:
    retrieving, by the processor, location rules associated with the particular physical location and retrieving a user profile of a user of the mobile device;
    selecting, by the processor, content to be made available to the mobile device based on the location rules associated with the particular physical location and the user profile; and
    communicating, by the processor, to the mobile device at least a first message, the first message specifying an authorization for the mobile device to access the selected content using at least one application installed on the mobile device, the first message configured to be processed by the mobile device to access the selected content.

16. The computer program product of claim 15, wherein the determining that the mobile device is located at the particular physical location comprises detecting that the mobile device is present within a virtual perimeter defined at the particular physical location.

17. The computer program product of claim 15, wherein the access to the selected content is only available to be initiated by the mobile device while the mobile device still is located at the particular physical location.

18. The computer program product of claim 15, the method further comprising:
  detecting that the mobile device is no longer present at the particular physical location; and
  responsive to detecting that the mobile device is no longer present at the particular physical location, communicating at least a second message to the mobile device, the second message causing the mobile device to disable functionality that enables the user to access the selected content.

19. The computer program product of claim 18, wherein the second message further causes the at least one application installed on the mobile device to close.

20. The computer program product of claim 18, wherein the detecting that the mobile device is no longer present at the particular physical location comprises detecting that the mobile device has left a virtual perimeter defined at the particular physical location.

* * * * *